US012494606B2

(12) United States Patent
Yanase et al.

(10) Patent No.: US 12,494,606 B2
(45) Date of Patent: Dec. 9, 2025

(54) BOARD-TO-BOARD CONNECTOR

(71) Applicant: SMK Corporation, Tokyo (JP)

(72) Inventors: Tomoyasu Yanase, Tokyo (JP); Kiyoshi Asai, Tokyo (JP); Naoyuki Ono, Tokyo (JP)

(73) Assignee: SMK Corporation, Tokyo (JP)

( * ) Notice: Subject to any disclaimer, the term of this patent is extended or adjusted under 35 U.S.C. 154(b) by 329 days.

(21) Appl. No.: 18/297,700

(22) Filed: Apr. 10, 2023

(65) Prior Publication Data

US 2024/0055811 A1 Feb. 15, 2024

(30) Foreign Application Priority Data

Aug. 10, 2022 (JP) ................................ 2022-127640

(51) Int. Cl.
*H01R 13/6597* (2011.01)
*H01R 12/71* (2011.01)
*H01R 13/6471* (2011.01)

(52) U.S. Cl.
CPC ....... *H01R 13/6597* (2013.01); *H01R 12/716* (2013.01); *H01R 13/6471* (2013.01)

(58) Field of Classification Search
CPC .......................... H01R 12/716; H01R 13/6597
See application file for complete search history.

(56) References Cited

U.S. PATENT DOCUMENTS 9,742,121 B2 * 8/2017 Hayashi ................. H01R 24/60
10,644,420 B1 * 5/2020 Ishida .................... H01R 13/11
10,811,824 B2 * 10/2020 Teruki .................. H01R 12/716
10,862,234 B2 * 12/2020 Horino ................... H01R 13/04
11,239,612 B2 * 2/2022 Lee ..................... H01R 13/6594
11,404,809 B2 * 8/2022 Oosaka .............. H01R 13/6582
11,509,083 B2 * 11/2022 Lee ........................ H01R 13/20
11,527,847 B2 * 12/2022 Oosaka ................ H01R 13/518
11,563,288 B2 * 1/2023 Oosaka ................ H01R 13/518
(Continued)

FOREIGN PATENT DOCUMENTS

JP 2021-012780 A 2/2021
JP 3230774 U 2/2021
(Continued)

*Primary Examiner* — Marcus E Harcum
(74) *Attorney, Agent, or Firm* — Studebaker Brackett PLLC

(57) ABSTRACT

Provided is a board-to-board connector including a housing having a protrusion, one or more signal terminals held on the housing such that a contact portion is exposed to the side of the protrusion, a high-frequency signal terminal arranged outside an end portion of the protrusion, and a shell surrounding an outer peripheral portion of the housing and made of a conductive metal material. In the board-to-board connector, the shell integrally includes a GND terminal portion having a plate-shaped board-side shielding portion arranged on a bottom portion outside the end portion of the protrusion and a plate-shaped GND terminal body standing on the protrusion-side end of the board-side shielding portion and arranged closer to the protrusion with respect to the high-frequency signal terminal, and a high-frequency signal terminal housing hole in which the high-frequency signal terminal is arranged is formed in the board-side shielding portion.

5 Claims, 9 Drawing Sheets

(56) References Cited

U.S. PATENT DOCUMENTS

| | | | | |
|---|---|---|---|---|
| 11,870,184 | B2 * | 1/2024 | Okubo | H01R 13/6597 |
| 12,142,860 | B2 * | 11/2024 | Horino | H01R 13/6582 |
| 12,218,446 | B2 * | 2/2025 | Miyazaki | H01R 13/6588 |
| 2010/0055984 | A1 * | 3/2010 | Tsuchida | H01R 12/716<br>439/626 |
| 2017/0033505 | A1 * | 2/2017 | Ozeki | H01R 13/6581 |
| 2020/0220307 | A1 * | 7/2020 | Sunaga | H01R 13/6591 |
| 2020/0244011 | A1 * | 7/2020 | Kitazawa | H01R 13/6585 |
| 2021/0005993 | A1 | 1/2021 | Yanase et al. | |
| 2021/0143586 | A1 * | 5/2021 | Ishida | H01R 13/6585 |
| 2021/0175649 | A1 | 6/2021 | Amemori et al. | |
| 2021/0218200 | A1 | 7/2021 | Shimomura et al. | |
| 2021/0359441 | A1 | 11/2021 | Oosaka | |
| 2022/0140512 | A1 | 5/2022 | Amemori et al. | |
| 2023/0064606 | A1 * | 3/2023 | Horino | H01R 13/50 |
| 2023/0216227 | A1 * | 7/2023 | Tsukamoto | H01R 13/115<br>439/660 |
| 2023/0246359 | A1 * | 8/2023 | Suzuki | H01R 12/716<br>439/74 |
| 2023/0335930 | A1 * | 10/2023 | Morita | H01R 13/405 |

FOREIGN PATENT DOCUMENTS

| | | | | |
|---|---|---|---|---|
| JP | 2021-111596 | A | | 8/2021 |
| JP | 2021-197328 | A | | 12/2021 |
| KR | 20210139139 | A | * | 11/2021 |
| WO | 2020/039666 | A1 | | 2/2020 |
| WO | 2021/020533 | A1 | | 2/2021 |
| WO | 2022/080453 | A1 | | 4/2022 |

* cited by examiner

BOARD-TO-BOARD CONNECTOR

CROSS-REFERENCE TO RELATED APPLICATION

This application claims priorities from Japanese Patent Application No. 2022-127640 filed with the Japan Patent Office on Aug. 10, 2022. The entire contents of both applications are hereby incorporated by reference.

BACKGROUND

1. Technical Field

The present invention relates to a board-to-board connector including a high-frequency signal terminal.

2. Related Art

Conventionally, a connector (hereinafter, referred to as a board-to-board connector) used for board-to-board connection includes a plug having a protruding fitting raised portion in which one or more plug signal terminals are arranged, and a socket having one or more socket signal terminals in a fitting groove into which the fitting raised portion is to be inserted. By fitting the fitting raised portion in the fitting groove, these signal terminals contact and are electrically connected to each other.

As the board-to-board connector of this type, one has been known, in which outer peripheral portions of a socket and a plug are surrounded by a shell made of a conductive metal material to enhance shielding properties.

Meanwhile, in the board-to-board connector of this type, a signal terminal is arranged between high-frequency signal terminals, and therefore, there is a probability that signal interference such as crosstalk occurs.

For this reason, there has been conventionally developed a device in which a plate-shaped GND terminal is arranged between a high-frequency signal terminal and a signal terminal to suppress signal interference, such as crosstalk, occurring between the high-frequency signal terminals and between the high-frequency signal terminal and the signal terminal (see, for example, JP-A-2021-197328).

In addition, as the board-to-board connector of this type, there has been developed a board-to-board connector in which a plate-shaped shield wall portion is provided between a high-frequency signal terminal and a signal terminal integrally with a shell surrounding an outer peripheral portion of a housing (see, for example, WO 2022/080453 A).

SUMMARY

A board-to-board connector according to the present invention is a board-to-board connector including a housing having a protrusion, one or more signal terminals held on the housing such that a contact portion is exposed to the side of the protrusion, a high-frequency signal terminal arranged outside an end portion of the protrusion, and a shell surrounding an outer peripheral portion of the housing and made of a conductive metal material.

In the board-to-board connector, the shell integrally includes a GND terminal portion having a plate-shaped board-side shielding portion arranged on a bottom portion outside the end portion of the protrusion and a plate-shaped GND terminal body standing on the protrusion-side end of the board-side shielding portion and arranged closer to the protrusion with respect to the high-frequency signal terminal, and a high-frequency signal terminal housing hole in which the high-frequency signal terminal is arranged is formed in the board-side shielding portion.

DETAILED DESCRIPTION

Figure 1:
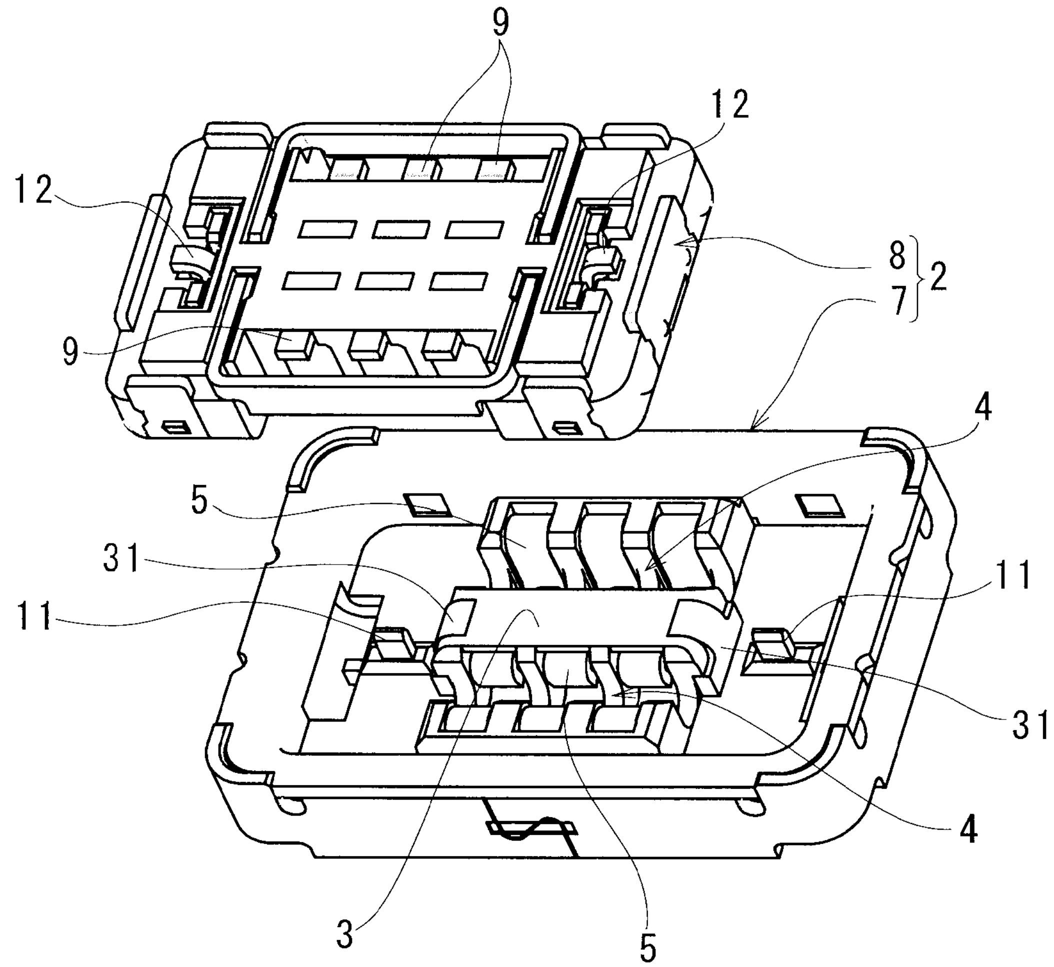
FIG. 1 is an exploded perspective view showing one example of a board-to-board connector according to the present invention.
Figure 2:
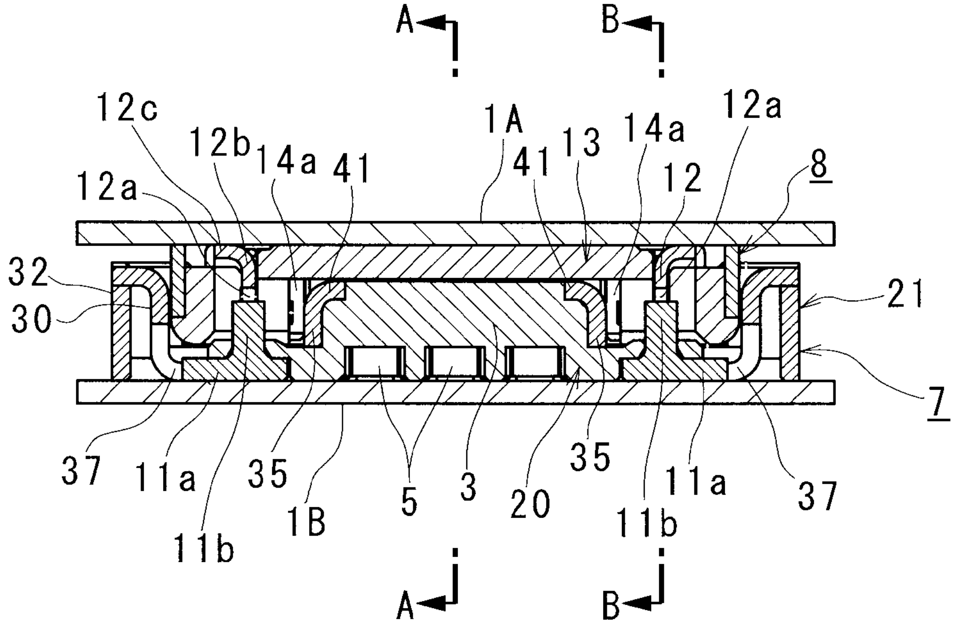
FIG. 2 is a longitudinal sectional view of the connector.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

However, in the conventional technique such as Prior Literature 1 above, the plate-shaped GND terminal interposed between the high-frequency signal terminal and the signal terminal and the shell surrounding the housing are configured as separate members, and therefore, there is a problem that the number of components and the number of assembling steps are increased.

In addition, since the GND terminal and the shell surrounding the housing are configured as the separate members, there is a probability that unless the shell and the GND terminal are reliably connected, a function of suppressing signal interference, such as crosstalk, between the high-frequency signal terminals and between the high-frequency signal terminal and the signal terminal is not sufficiently fulfilled.

Further, in a structure in which the GND terminal contacts a wall portion separating a fitting groove or an end portion of a protrusion such as a fitting raised portion, there is a probability that the resin protrusion and the GND terminal contact each other due to, e.g., oblique insertion upon connector fitting and are damaged. Particularly, in recent years, the size of the connector has been reduced, and such a problem has become remarkable.

On the other hand, in the conventional technique as described in WO 2022/080453 A, since the shield wall portion is not directly connected to the board and the periphery of the high-frequency signal terminal is not surrounded, there is a probability that a function of suppressing signal interference, such as crosstalk, between the high-frequency signal terminals and between the high-frequency signal terminal and the signal terminal is not sufficiently fulfilled.

In view of these conventional problems, an object of the present invention is to provide a board-to-board connector capable of suppressing signal interference, such as crosstalk, between high-frequency signal terminals and between a high-frequency signal terminal and a signal terminal.

In order to solve the above-described conventional problems, a first aspect of the invention is a board-to-board connector according to the present invention is a board-to-board connector including a housing having a protrusion, one or more signal terminals held on the housing such that a contact portion is exposed to the side of the protrusion, a high-frequency signal terminal arranged outside an end portion of the protrusion, and a shell surrounding an outer peripheral portion of the housing and made of a conductive metal material.

In the board-to-board connector, the shell integrally includes a GND terminal portion having a plate-shaped board-side shielding portion arranged on a bottom portion outside the end portion of the protrusion and a plate-shaped GND terminal body standing on the protrusion-side end of the board-side shielding portion and arranged closer to the protrusion with respect to the high-frequency signal terminal, and a high-frequency signal terminal housing hole in which the high-frequency signal terminal is arranged is formed in the board-side shielding portion.

A second aspect of the invention is the configuration of the first aspect, in which the board-side shielding portion is formed with a board mounting portion which is exposed to the board side of the housing.

A third aspect of the invention is the configuration of the first aspect, in which the GND terminal portion integrally includes a reinforcing piece bent toward the protrusion from the upper edge of the GND terminal body.

A fourth aspect of the invention is the configuration of the first aspect, in which the GND terminal body is formed with a length with which the upper end thereof reaches the top surface of the protrusion, and the end surface of the protrusion is covered with the GND terminal body.

A fifth aspect of the invention is the configuration of the third or fourth aspect, in which a partner connector includes a partner GND terminal exposed at a portion facing the end surface of the protrusion and made of a conductive metal material, and the partner GND terminal contacts the GND terminal body.

A sixth aspect of the invention is the configuration of the first or second aspect, in which a partner connector includes a partner high-frequency signal terminal that comes into contact with the high-frequency signal terminal, the partner high-frequency signal terminal has a connection groove formed by punching a conductive metal plate material, and the high-frequency signal terminal is inserted into the connection groove with the plate thickness directions thereof perpendicular to each other and accordingly contacts a cut surface formed as the inner surface of the connection groove.

The board-to-board connector according to the present invention has the configuration according to the first aspect, so that the number of components and the number of work steps can be reduced and signal interference, such as crosstalk, between the high-frequency signal terminals and between the high-frequency signal terminal and the signal terminal can be suitably suppressed.

The present invention has the configuration of the second aspect, so that the configuration connected to a board connection pattern is arranged inside the shell. Thus, the length of a conductive path from the GND terminal body to the board mounting portion can be shortened, and the size of the entire connector can be reduced. The high-frequency terminal is surrounded by the directly-grounded board-side shielding portion so that the signal interference suppression effect and the shielding effect can be further improved.

Further, the present invention has the configurations of the third to fourth aspects so that both end portions of the protrusion can be reinforced by the metal members, and robustness can be enhanced. Thus, even if there is erroneous insertion such as oblique insertion, damage of the connector can be prevented.

In addition, the present invention has the configuration of the fifth aspect, and therefore, the GND terminal bodies arranged at both ends of the protrusion and the partner GND terminals of the partner connector contact each other at the metal. Thus, scraping of the resin material forming the protrusion can be prevented.

Moreover, the present invention has the configuration of the sixth aspect so that the partner high-frequency signal terminal can be manufactured only by punching without bending. Thus, it is possible to obtain, with a simpler structure, a suitable state of connection with the high-frequency signal terminal.

Next, an embodiment of a board-to-board connector according to the present invention will be described based on an example shown in FIGS. 1 to 10C. Note that in the figures, reference numerals 1A, 1B denote boards, and reference numeral 2 denotes a board-to-board connector.

In the present embodiment, a plug 8 will be defined and described as a partner connector.

As shown in FIGS. 1 to 4, the board-to-board connector 2 includes a socket 7 in which a plurality of signal terminals (hereinafter, referred to as socket signal terminals 5, 5 . . . ) is arranged in a plurality of fitting grooves 4, 4 separated by a protrusion 3. Protruding fitting raised portions 10, 10, in which a plurality of signal terminals (hereinafter, referred to as plug signal terminals 9, 9 . . . ) is arranged, of the partner connector (plug 8) are fitted in the fitting grooves 4, 4, and accordingly, these signal terminals contact and are electrically connected to each other.

Further, the connector 2 includes high-frequency signal terminals (hereinafter, referred to as socket high-frequency signal terminals 11, 11) arranged outside end portions of the protrusion 3 of the socket 7, and when the plug 8 and the socket 7 are fitted to each other, the socket high-frequency signal terminals 11, 11 are connected to partner high-frequency signal terminals (hereinafter, referred to as plug high-frequency signal terminals 12, 12) arranged corresponding to the socket high-frequency signal terminals 11, 11 in the plug 8.

Figure 5A:
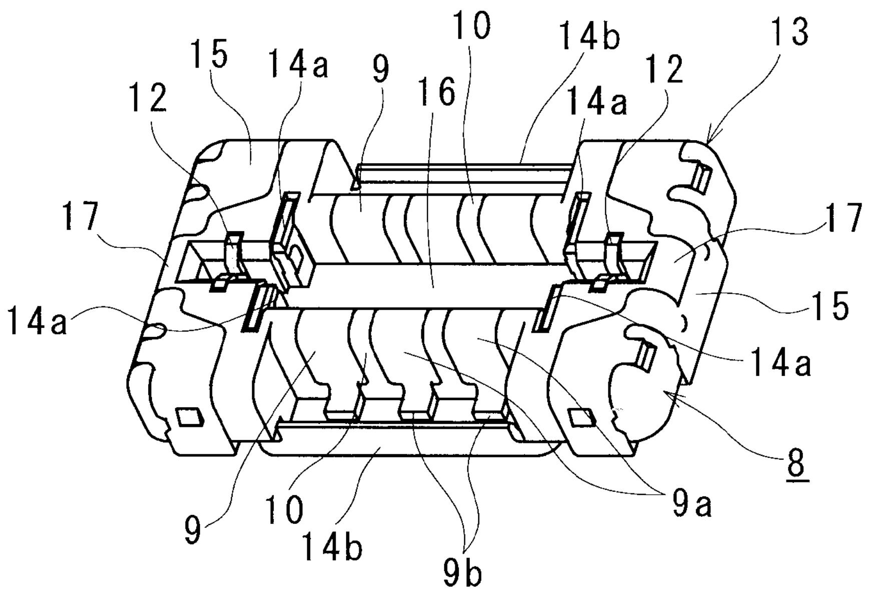
FIG. 5A is a perspective view of a plug of FIG. 4 as viewed from a joint side.
Figure 5B:
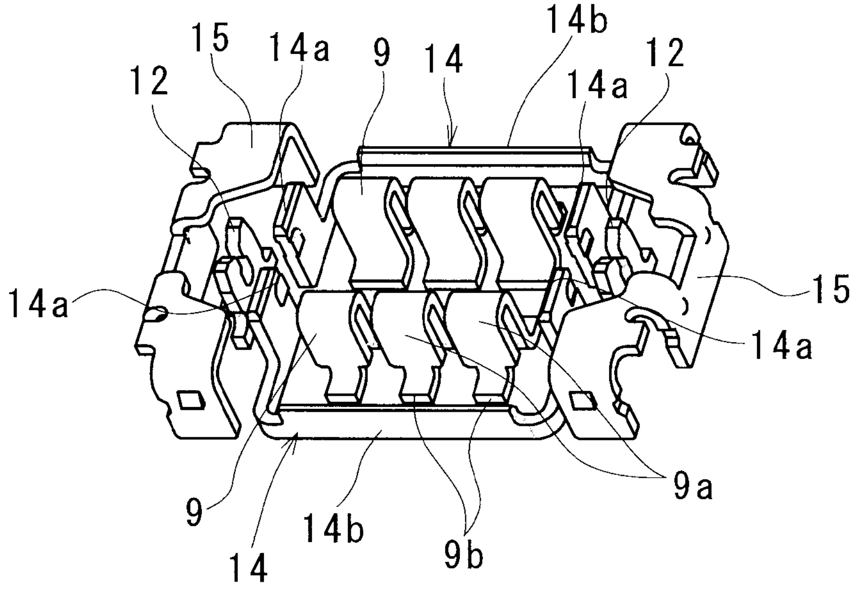
FIG. 5B is a perspective view of the plug without an insulator.

As shown in FIGS. 5A and 5B, the plug 8 includes a plug housing 13 having the protruding fitting raised portions 10, 10, the one or more plug signal terminals 9, 9 . . . arranged on the fitting raised portions 10, 10, the pair of plug high-frequency signal terminals 12, 12 arranged at both end portions of the plug housing 13, partner GND terminals (hereinafter, referred to as plug GND terminals 14, 14) arranged among the plug signal terminals 9, 9 . . . and the plug high-frequency signal terminals 12, 12, and plug shielding members 15, 15 covering both end portions of the plug housing 13. The plug signal terminals 9, 9 . . . , the plug high-frequency signal terminals 12, 12, the plug GND terminals 14, 14, and the plug shielding members 15, 15 are incorporated into the plug housing 13 by insert molding.

The plug housing 13 includes the pair of protruding fitting raised portions 10, 10 protruding in parallel from a bottom plate portion 16, and end portions 17, 17 coupling end portions of both the fitting raised portions 10, 10, the fitting raised portions 10, 10 and the end portions 17, 17 define a rectangular frame shape in plan view, the plug signal terminals 9, 9 . . . are each incorporated in the fitting raised portions 10, 10, and the plug high-frequency signal terminals 12, 12 are incorporated in the end portions.

The plug signal terminals 9, 9 . . . are integrally formed by pressing a conductive metal plate material, and include U-shaped contact pieces 9*a* exposed at the surfaces of the fitting raised portions 10, 10 and board connection terminal pieces 9*b*, 9*b* each of which has a shape bent perpendicularly outward from each end of the contact piece 9*a*.

Each of the plug high-frequency signal terminals 12, 12 is formed in a plate shape by punching a conductive metal plate material, and includes a U-shaped connection piece 12*b* having a slit-shaped connection groove 12*a* opened to one end side and a board connection piece 12*c* arranged on the side opposite to the connection groove 12*a* and exposed on the board side of the plug housing 13, and the socket high-frequency signal terminal 11 is inserted into the connection groove 12*a*.

The connection groove 12*a* is formed by punching a conductive metal plate material into a U-shape The socket high-frequency signal terminal 11 formed in the plate shape is inserted into the connection groove 12*a* with the plate thickness directions thereof perpendicular to each other, and accordingly, contacts the cut surface of the connection groove 12*a* formed as an inner surface by punching.

That is, since the plug high-frequency signal terminals 12, 12 can be manufactured only by punching without bending, it is possible to obtain, with a simpler structure, a suitable state of connection with the socket high-frequency signal terminal 11.

The position of contact between the socket high-frequency signal terminal 11 and the plug high-frequency signal terminal 12 can be adjusted according to high-frequency performance to be obtained by changing the thickness of the metal plate material forming the plug high-frequency signal terminal 12 or the width of a portion (connection raised piece 11*b* to be described later) contacting the plug high-frequency signal terminal 12.

Figure 6A:
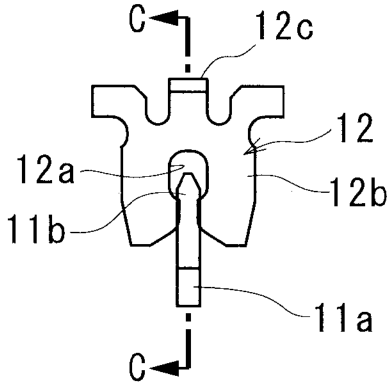
FIG. 6A is a front view for describing the state of connection between a plug high-frequency signal terminal and a socket high-frequency signal terminal.
Figure 6B:
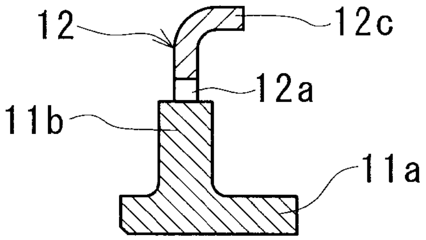
FIG. 6B is a sectional view along a C-C line.
Figure 6C:
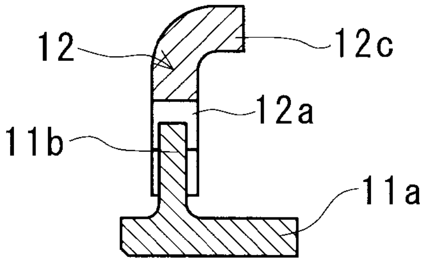
FIG. 6C is a sectional view along the C-C line in the case of another aspect.

Further, in the example shown in FIGS. 6A and 6B, the width of the connection raised piece 11*b* is made greater than the thickness of the metal plate material forming the plug high-frequency signal terminal 12, so that contact can be reliably made between both the high-frequency signal terminals 11, 12 even if displacement occurs therebetween. Alternatively, as shown in FIG. 6C, the thickness of the metal plate material forming the plug high-frequency signal terminal 12 may be made greater than the width of the connection raised piece 11*b*, so that contact can be reliably made between both the high-frequency signal terminals 11, 12 even if displacement occurs therebetween.

The plug GND terminals 14, 14 are integrally formed by pressing a conductive plate material, and each plug GND terminal 14 includes a pair of plate-shaped GND terminal plates 14*a*. 14*a* facing each other and a U-shaped signal terminal shielding portion 14*b* coupling the outer lower ends of both the GND terminal plates 14*a*, 14*a*.

Each of the GND terminal plates 14*a*. 14*a* is formed in a rectangular plate shape, and is incorporated into the plug housing 13 in a state of being exposed at a portion facing the end surface of the protrusion 3 of the socket 7. Each of the GND terminal plates 14*a*, 14*a* is arranged between a corresponding one of the plug signal terminals 9, 9 . . . and a corresponding one of the plug high-frequency signal terminals 12, 12, and shields between the plug high-frequency signal terminals 12, 12 and between the plug high-frequency signal terminal 12 and the plug signal terminal 9.

In addition, the signal terminal shielding portion 14*b* surrounds the outside of the board connection pieces 9*b* of the plurality of plug signal terminals 9, 9 . . . exposed to the side of the plug housing 13.

As shown in FIGS. 7A, 7B, 8A, and 8B, the socket 7 includes a socket housing 20 made of insulating resin, the plurality of socket signal terminals 5, 5 . . . each arranged in the fitting grooves 4, 4 arranged in parallel with respect to the protrusion 3, the pair of socket high-frequency signal terminals 11, 11 each arranged at both end portions of the socket housing 20, and a shell 21 surrounding the outside of the socket housing 20, and the socket high-frequency signal terminals 11, 11 and the shell 21 are incorporated into the socket housing 20 by insert molding.

The socket housing 20 includes the protrusion 3 arranged at a center portion of a flat plate-shaped bottom plate portion 22 and side walls 23, 23 spaced apart from both sides of the protrusion 3, and the fitting grooves 4, 4 in which the fitting raised portions 10, 10 are inserted are formed in parallel among both side walls 23, 23 and the protrusion 3.

In the socket housing 20, recessed hole-shaped signal terminal insertion portions 24, 24 . . . opened to the lower side are formed over the side walls 23, 23 and the protrusion 3, the plug signal terminals 9, 9 . . . are each press-fitted in the signal terminal insertion portions 24, 24 . . . , and the contact portions of the plug signal terminals 9, 9 . . . are held in a state of protruding into the fitting grooves 4, 4.

Figure 3:
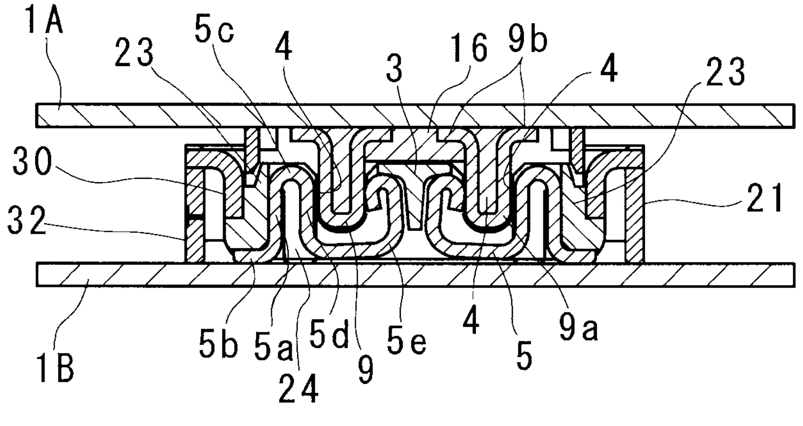
FIG. 3 is a sectional view of the connector along an A-A line.
Figure 4:
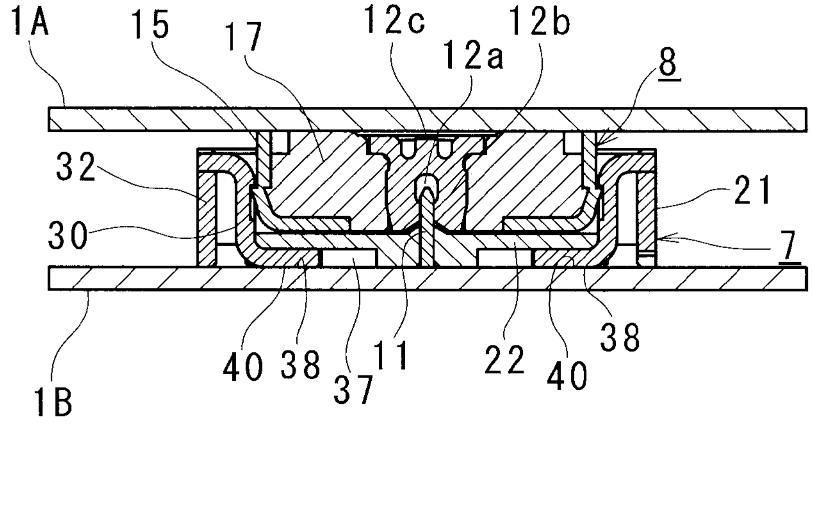
FIG. 4 is a sectional view of the connector along a B-B line.
Figure 7A:
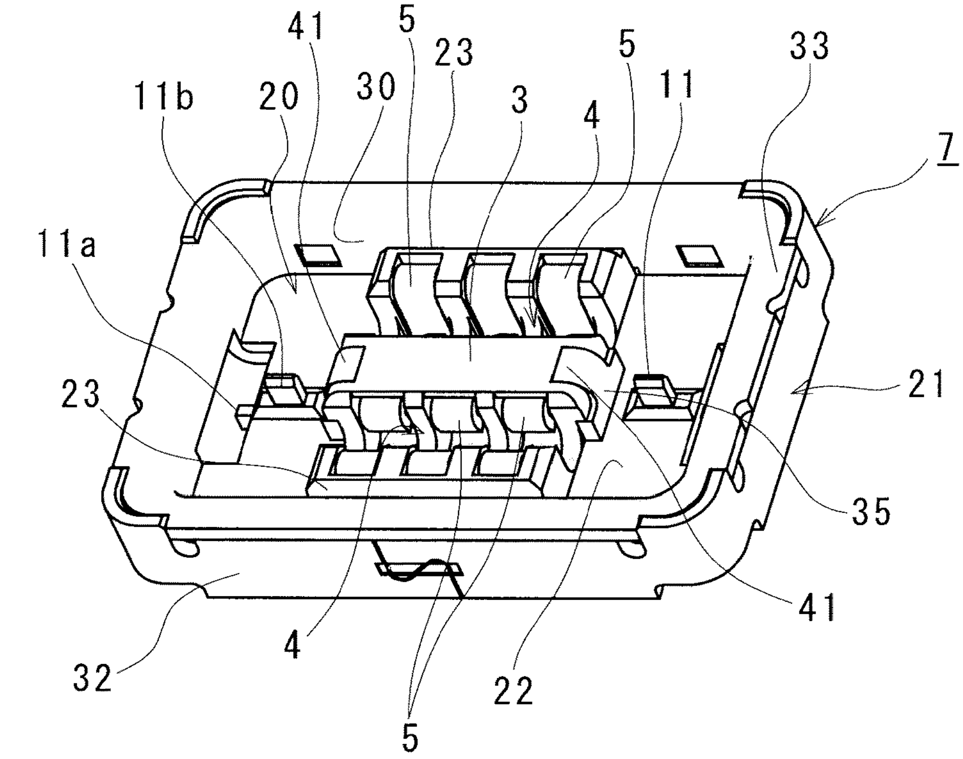
FIG. 7A is a perspective view of a socket of FIG. 4 as viewed from the joint side.
Figure 7B:
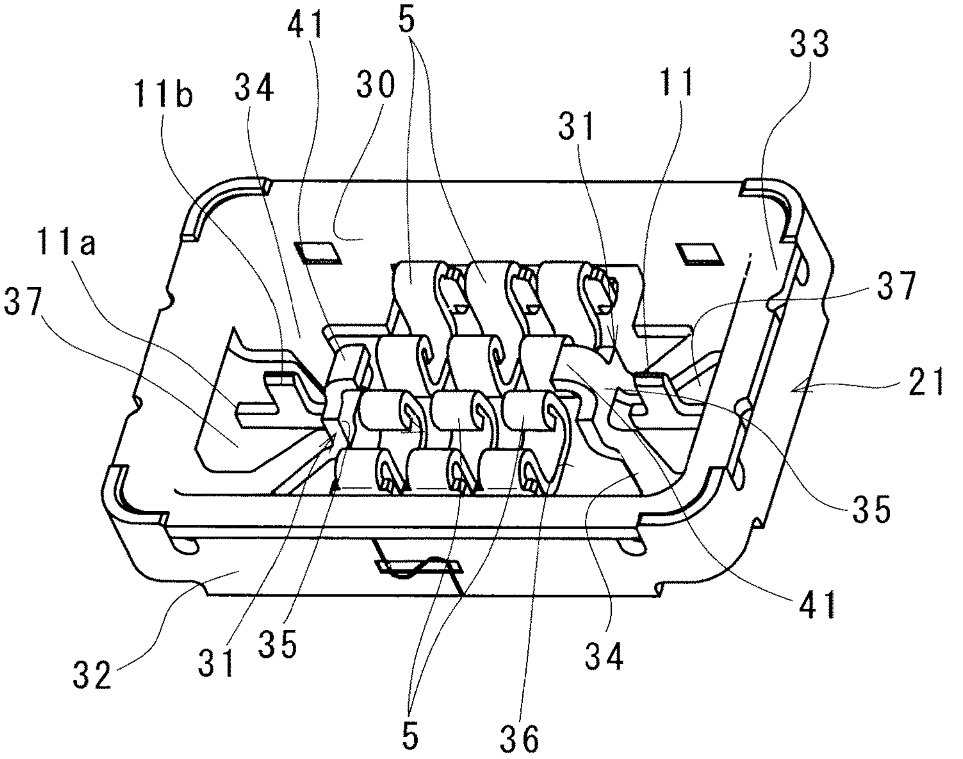
FIG. 7B is a perspective view of the socket without an insulator.
Figure 8A:
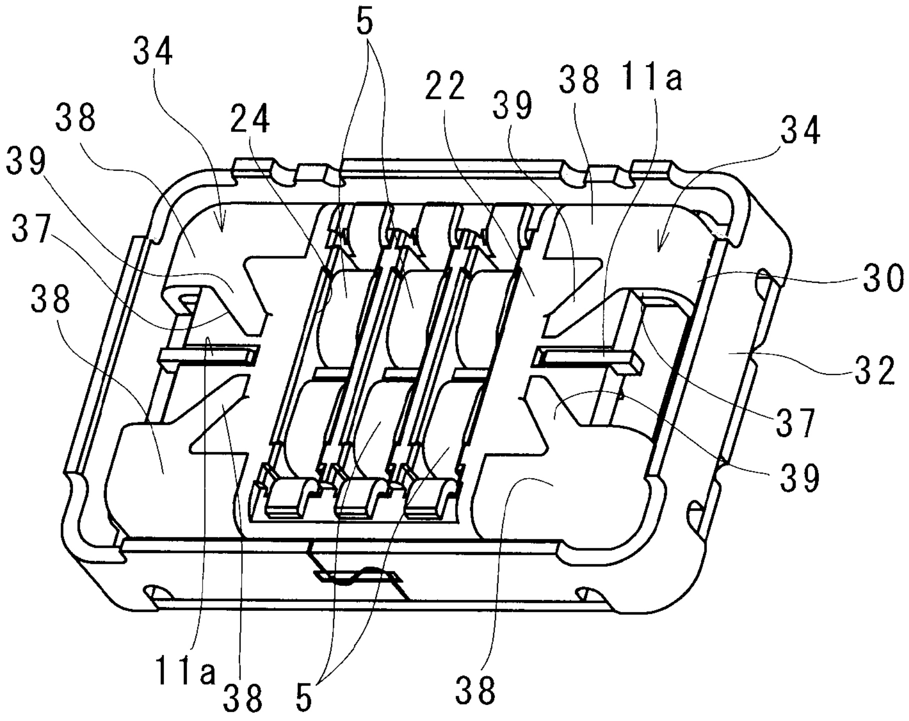
FIG. 8A is a perspective view of the socket as viewed from a board connection side.
Figure 8B:
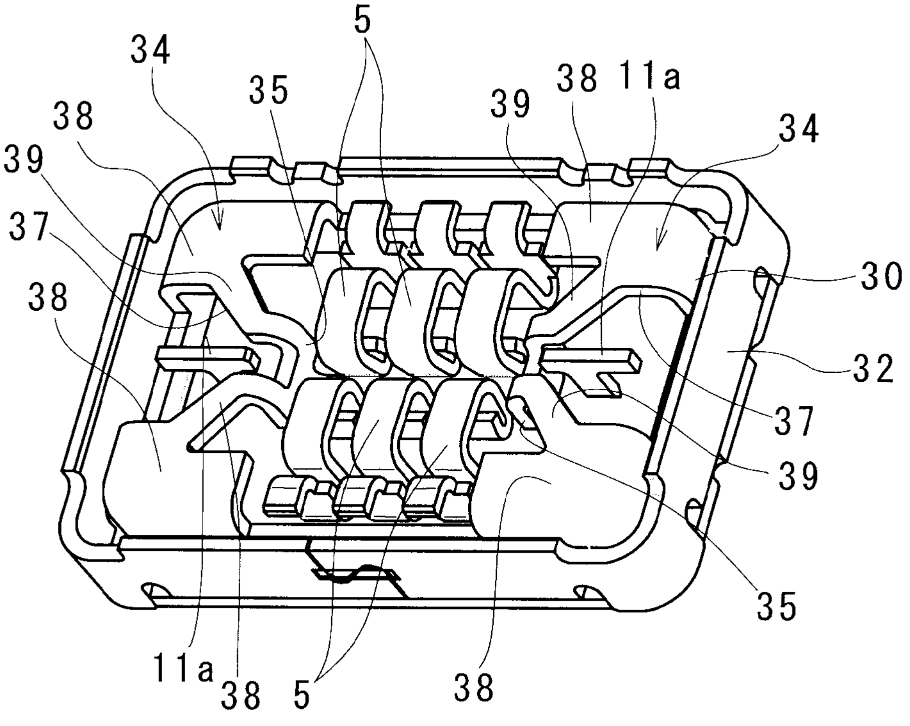
FIG. 8B is a perspective view of the socket without the insulator.
Figure 9A:
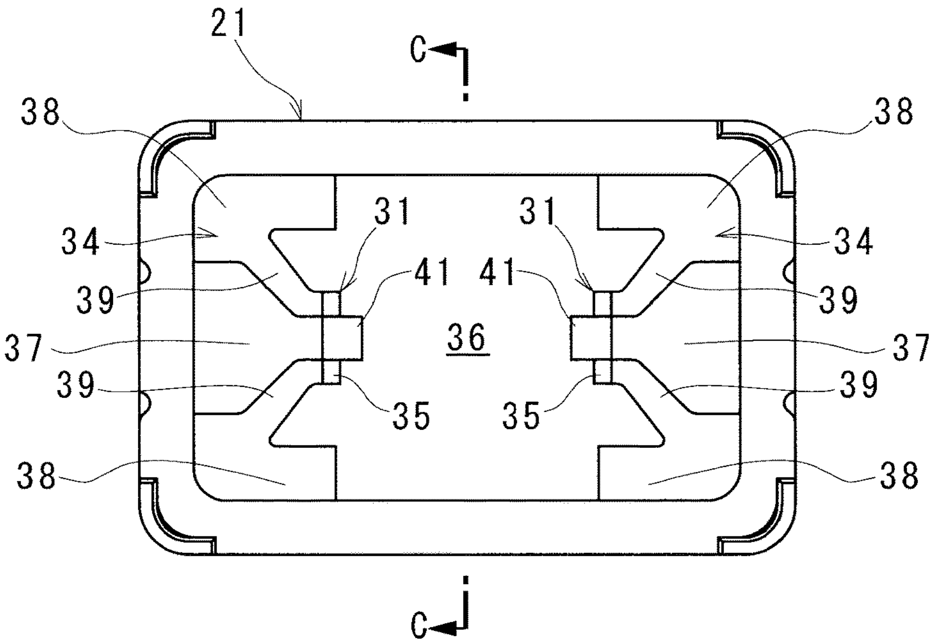
FIG. 9A is a plan view showing a shell.
Figure 9B:
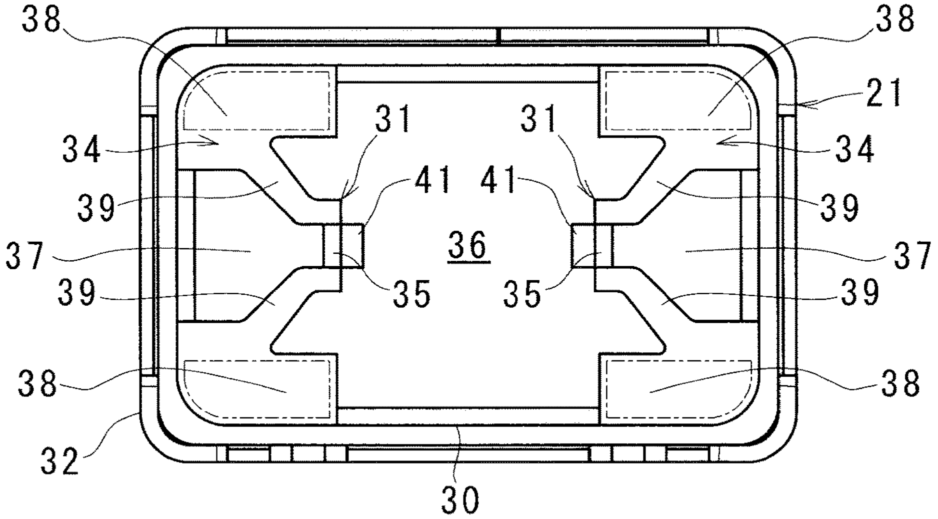
FIG. 9B is a bottom view of the shell.
Figure 9C:
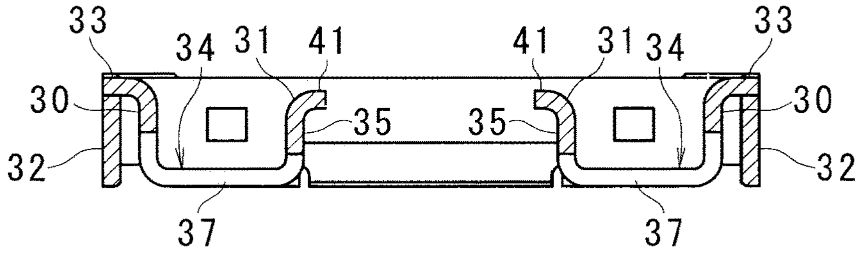
FIG. 9C is a longitudinal sectional view of the shell.
Figure 9D:
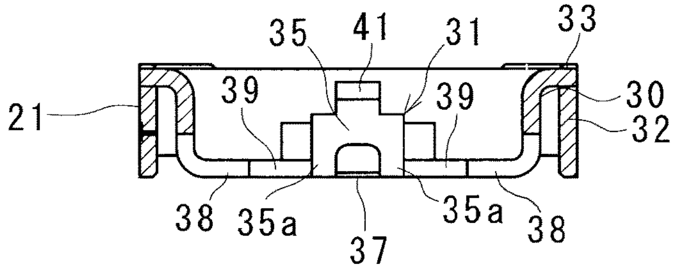
FIG. 9D is a sectional view of the shell along a C-C line.

As shown in FIGS. 3, 7A, and 7B, each of the socket signal terminals 5, 5 . . . is integrally formed in such a manner that a conductive metal plate material is punched into a predetermined shape to form a punched member and the punched member is bent in the plate thickness direction thereof, and includes a terminal base piece 5*a* fixed to the socket housing 20; a board connection terminal piece 5*b* having a shape bent 1I vertically outward from one end (lower end) of the terminal base piece 5*a*, a coupling piece 5*c* folded back in an arc shape from the other end of the terminal base piece 5*a*, a swing base portion 5*d* swingably supported on the other end of the coupling piece 5*c*, and an elastic contact piece 5*e* supported on the lower end of the swing base portion 5*d*.

The socket signal terminals 5, 5 . . . are incorporated into a contact insertion portion of the socket housing 20 from the lower side, and accordingly, the terminal base pieces 5*a* are fixed to the side walls 23, 23, the swing base portions 5*d* are exposed to the inside of the side walls 23, 23, and the elastic contact pieces 5*e* protrude from the outer surface of the protrusion 3.

Each of the socket high-frequency signal terminals 11, 11 is integrally formed by punching a conductive plate material, and includes a thin plate-shaped board connection piece 11*a* and the rod-shaped connection raised piece 11*b* protruding from the upper surface of the board connection piece 11*a*. The connection raised piece 11*b* projects from the bottom plate portion 22 of the socket housing 20.

As shown in FIGS. 9A to 9D, the shell 21 is made of a conductive metal plate material, and includes a rectangular tubular inner wall portion 30, GND terminal portions 31, 31 integrally supported on bottom portions of the inner wall portion 30 outside both end portions of the protrusion 3, and an outer wall portion 32 covering the outside of the inner wall portion 30, and an outer peripheral portion of the socket housing 20 is surrounded by double peripheral walls formed of the inner and outer wall portions 30, 32.

By drawing the conductive plate material, the bottomed inner wall portion 30 recessed in the plate material and having no seam in the circumferential direction thereof, a flange portion 33 projecting outward from the peripheral edge of an upper edge portion of the inner wall portion 30, and a thin plate supported on one side of the flange portion 33 are formed in the shell 21, and the outer wall portion 32 surrounding the outer side of the inner wall portion 30 is formed in such a manner that the thin plate folded back toward the inner wall portion 30 is bent along the inner wall portion 30 and both ends of the thin plate are joined.

By punching and bending the bottom plate, the GND terminal portions 31, 31 each of which has a plate-shaped board-side shielding portion 34 arranged on the bottom portion outside the end portion of the protrusion 3 and a plate-shaped GND terminal body 35 standing on the protrusion 3 side end of the board-side shielding portion 34 and covering the end surface of the protrusion 3 are integrally formed, at the bottom portion of the inner wall portion 30, on both sides of the shell 21 in the longitudinal direction thereof, and a signal terminal housing portion 36 in which the plurality of socket signal terminals 5, 5 . . . is arrangeable side by side is formed between the GND terminal portions 31, 31.

That is, the GND terminal portions 31, 31 are arranged between both the socket high-frequency signal terminals 11, 11 and between the socket high-frequency signal terminal 11 and the socket signal terminal 5, and shield between both the socket high-frequency signal terminals 11, 11 and between the socket high-frequency signal terminal 11 and the socket signal terminal 5.

Note that the arrangement and form of the GND terminal portions 31, 31 are not limited to those of the present embodiment, and appropriate arrangement and form can be selected according to the arrangement of the socket high-frequency signal terminals 11, 11 and the socket signal terminals 5, 5 . . . . For example, depending on the arrangement of the socket high-frequency signal terminals 11, 11 and the socket signal terminals 5, 5 . . . , the GND terminal portions 31, 31 may be arranged on both sides of the shell 21 in the lateral direction thereof.

The board-side shielding portion 34 has a high-frequency signal terminal housing hole 37 at a center portion, and includes a pair of board mounting portions 38, 38 arranged on both sides of the high-frequency signal terminal housing hole 37 in the lateral direction of the shell 21 and terminal body supporting portions 39, 39 extending diagonally from inner portions of the board mounting portions 38, 38. The socket high-frequency signal terminal 11 is arranged in the high-frequency signal terminal housing hole 37.

The board mounting portions 38, 38 are formed with predetermined area and shape (in the present embodiment, a rectangular shape), and two adjacent outer sides thereof are integrally continuously supported via the lower edge of the inner wall portion 30 and the arc portions formed by drawing and form part of the bottom portion of the inner wall portion 30. Note that the shape of the board mounting portions 38, 38 is not limited to the above-described rectangular shape, and may be an arbitrary shape according to the connection pattern of the board to be mounted. In addition, in the present embodiment, the case where the board mounting portions 38, 38 are arranged on both sides of the high-frequency signal terminal housing hole 37 in the lateral direction of the shell 21 has been described, but the number of board mounting portions 38, 38 and the arrangement of the board mounting portions 38, 38 are not limited to those of the present embodiment and the board mounting portions 38, 38 may be arranged, for example, on the outside of the high-frequency signal terminal housing hole 37 in the longitudinal direction of the shell 21.

In a state of being incorporated into the socket housing 20, the board mounting portions 38, 38 are exposed at the bottom surface (board-side surface) of the socket housing 20, and can be directly mounted on a GND connection pattern 40 formed on a board 1B.

In addition, since the board mounting portions 38, 38 have such a structure that the board mounting portions 38, 38 are integrally continuously supported, inside the outer wall portion 32, via the lower edge of the inner wall portion 30 and the arc portions formed by drawing, a connection area upon soldering can be increased by an amount corresponding to the arc portions, a fillet can be favorably formed, and fixability with the board 1B can be improved. In addition, since it is configured such that the plug 8 is fitted in the inner wall portion 30, fitting and contact are not influenced at all even if solder wicking occurs on the outer peripheral side.

The terminal body supporting portions 39, 39 are formed in a thin plate shape, and extend diagonally from the inner edges of the board mounting portions 38, 38 toward the protrusion 3. The lower end of the GND terminal body 35 is supported on tip end portions of both the terminal body supporting portions 39, 39.

The GND terminal body 35 is formed in a rectangular plate shape, and has a lower edge portion supported on a pair of supporting portions 35*a*, 35*a* standing perpendicularly to both the terminal body supporting portions 39, 39. The GND terminal bodies 35 are arranged closer to the protrusion 3 with respect to the socket high-frequency signal terminals 11, 11, and are incorporated into the socket housing 20 so as to cover both the exposed end surfaces of the protrusion 3. With this configuration, the length of a conductive path from the GND terminal body 35 to the board mounting portions 38, 38 via the pair of supporting portions 35*a*, 35*a* and both the terminal body supporting portions 39, 39 can be shortened.

A reinforcing piece 41 bent from the upper edge of the GND terminal body 35 toward the protrusion 3 is provided integrally with such an upper edge, and is incorporated into the socket housing 20 such that the reinforcing piece 41 covers the exposed upper surface of the end portion of the protrusion 3.

The high-frequency signal terminal housing hole 37 is formed in a mountain shape extending from the GND terminal body 35 over the lower end portion of the inner wall portion 30 along the inside of the terminal body supporting portions 39, 39 and the board mounting portions 38, 38, and the socket high-frequency signal terminal 11 arranged inside the high-frequency signal terminal housing hole 37 is in such a state that the signal terminal side of the connection raised piece 11*b* is surrounded by the GND terminal body 35, the opposite side thereof is surrounded by the inner wall portion 30 of the shell 21, and both lateral sides of the board connection piece 11*a* are surrounded by the board mounting portions 38, 38 and the terminal body supporting portions 39, 39 forming the board-side shielding portion 34.

Figure 10A:
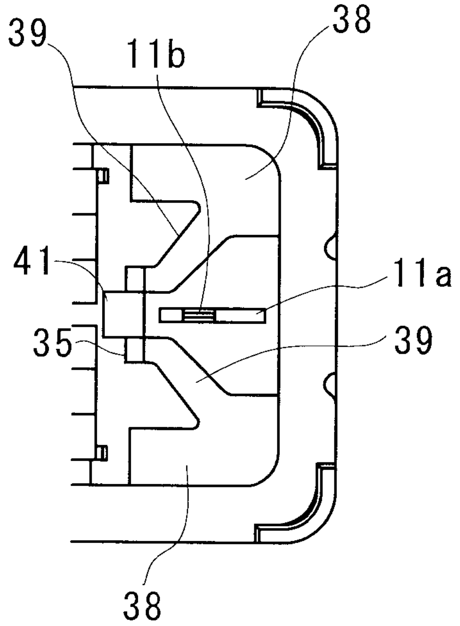
FIG. 10A is a partially-enlarged plan view showing the arrangement of the shell and the socket high-frequency signal terminal.
Figure 10B:
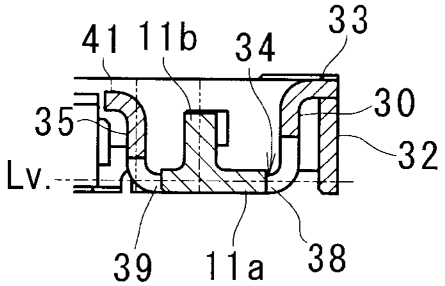
FIG. 10B is a longitudinal sectional view of the arrangement.
Figure 10C:
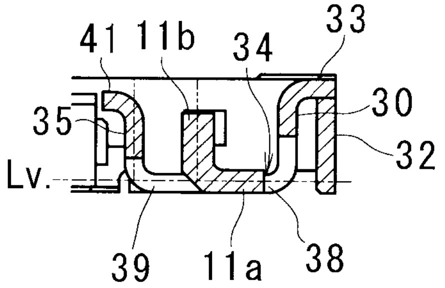
FIG. 10C is a longitudinal sectional view of the socket high-frequency signal terminal in the case of another embodiment.

That is, as shown in FIGS. 10A to 10C, the GND terminal portion 31 is configured such that according to the shape of the socket high-frequency signal terminal 11, the terminal body supporting portions 39, 39 and the board mounting portions 38, 38 are arranged in parallel at the same level (in the figure, Lv.) as that of the board connection piece 11*a* and the connection raised piece 11*b* and the GND terminal body 35 are arranged in parallel. The high-frequency performance can be adjusted by adjusting the distance to each position, and at the same time, shielding properties between the socket high-frequency signal terminal 11 and the socket signal terminal 5 can be obtained.

Note that the shape of the socket high-frequency signal terminal 11 can be changed considering a structural relationship with surrounding members, such as the distance to the GND terminal portion 31 and the thickness of the socket housing 20, thereby adjusting the high-frequency performance to be obtained. For example, in the example shown in FIG. 10B, the socket high-frequency signal terminal 11 has an inverted T-shape in side view. However, considering the high-frequency performance, the socket high-frequency signal terminal 11 may be formed in an L-shape in side view as in the example shown in FIG. 10C.

Moreover, since the terminal body supporting portions 39, 39 are arranged in a tapered shape, the board-side shielding portion 34 arranged around the socket high-frequency signal terminal 11 can suppress a rapid impedance change and achieve a smooth impedance change.

Further, the entirety of the terminal body supporting portions 39, 39 and the board mounting portions 38, 38 is provided for board mounting so that the area occupied by a board pattern installation portion can be ensured and the impedance can be adjusted over the entire area of the bottom portion. The impedance can also be controlled for the board mounting pattern.

Note that the shapes of the board-side shielding portion 34 and the high-frequency signal terminal housing hole 37 are not limited to those of the above-described example, and can be appropriately set according to the shape and arrangement of the socket high-frequency signal terminals 11, 11 and the shape and arrangement of the board mounting pattern. In addition, the shape and arrangement of the board mounting pattern can also be appropriately set according to the shapes of the board-side shielding portion 34 and the high-frequency signal terminal housing hole 37.

In the connector 2 configured as described above, the plug 8 and the socket 7 are fitted to each other with the fitting raised portions 10, 10 of the plug 8 aligned with the positions of the fitting grooves 4, 4 of the socket 7, whereby the plug signal terminals 9, 9 . . . and the socket signal terminals 5, 5 . . . are connected, the plug high-frequency signal terminals 12, 12 and the socket high-frequency signal terminals 11, 11 are connected, and the GND terminal portions 31, 31 and the plug GND terminals 14, 14 grounded to the boards are connected.

Since the GND terminal portions 31, 31 are formed integrally with the shell 21, the shell 21 is also grounded.

Thus, in the connector 2, the GND terminal bodies 35 and the plug GND terminals 14, 14 are arranged between the high-frequency signal terminals and between the signal terminal and the high-frequency signal terminal, and signal interference, such as crosstalk, between the high-frequency signal terminals and between the signal terminal and the high-frequency signal terminal can be suitably reduced.

Further, in the connector 2, since the socket high-frequency signal terminals 11, 11 are arranged inside the high-frequency signal terminal housing holes 37 of the board-side shielding portions 34 formed integrally with the shell 21, the periphery thereof can be surrounded by the GND terminal bodies 35 made of the conductive metal material, the inner wall 30 of the shell 21 made of the conductive metal material, the board mounting portions 38, 38 of the shell 21 made of the conductive metal material and the terminal body supporting portions 39, 39 of the shell 21 made of the conductive metal material, and a shielding effect on a high-frequency signal can be improved.

In addition, in this connector, the board mounting portions 38, 38 can be directly mounted on the GND connection pattern 40 of the board, and the length of the conductive path from the GND terminal body 35 to the board mounting portions 38, 38 is shortened as described above. Thus, the shielding effect by the GND terminal portions 31, 31 can be further enhanced, and the connection portion between the shell 21 and the board can be formed inside the peripheral wall portion of the shell 21. Consequently, the size of the entire connector (socket 7) can be reduced.

In the connector 2 configured as described above, the end surface of the end portion of the protrusion 3 is covered with the GND terminal body 35, and therefore, the metal material of the GND terminal bodies 35 can contact the metal material of the plug GND terminals 14, 14 and scraping of the protrusion 3 made of resin can be prevented.

Further, since the reinforcing piece 41 bent toward the protrusion 3 from the upper edge of the GND terminal body 35 is integrally provided, the upper surface of the end portion of the protrusion 3 is reinforced, and robustness is improved. Thus, even if there is erroneous insertion, such as oblique insertion, upon fitting between the plug 8 and the socket 7, damage can be prevented.

Figure 11:
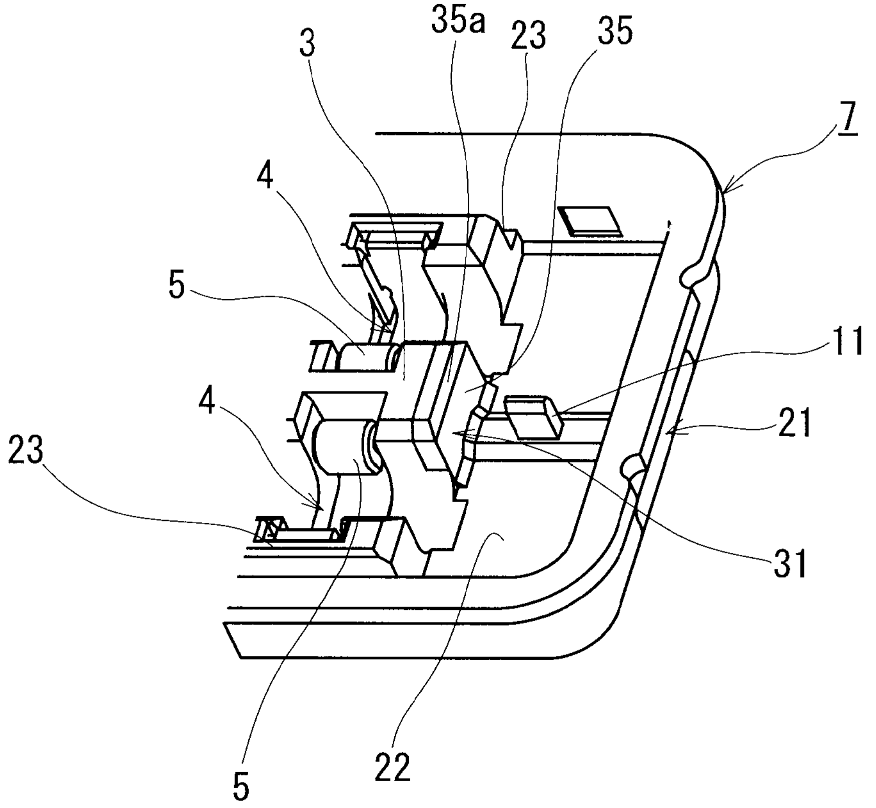
FIG. 11 is a partially-enlarged perspective view showing another embodiment of the socket.

Note that in the above-described embodiment, the case where the reinforcing piece 41 bent toward the protrusion 3 from the upper edge of the GND terminal body 35 is integrally provided has been described. However, as shown in FIG. 11, the GND terminal body 35 is formed with a length with which the upper end of the GND terminal body 35 reaches the top surface of the protrusion 3 and the end surface of the protrusion 3 is covered with the GND terminal body 35, so that the upper surface of the end portion of the protrusion 3 can be reinforced and the robustness can be improved. Note that the same reference numerals are used to represent the same configurations as those of the above-described embodiment, and description thereof will be omitted.

In this case, a chamfered portion 35*a* is preferably provided at an outer upper edge portion of the GND terminal body 35. With this chamfered portion 35*a*, the plug GND terminal 14 can be suitably guided, and even if there is erroneous insertion, such as oblique insertion, upon fitting between the plug 8 and the socket 7, damage can be prevented.

Note that in the present embodiment, the case where the plug 8 is the partner connector has been described, but the present invention can also be applied to the plug 8 using the fitting raised portions 10, 10 as the protrusion 3.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A board-to-board connector comprising: a housing having a protrusion; one or more signal terminals held on the housing such that a contact portion is exposed to a side of the protrusion; a high-frequency signal terminal arranged outside an end portion of the protrusion; and a shell surrounding an outer peripheral portion of the housing and made of a conductive metal material, wherein the shell integrally includes a GND terminal portion having a plate-shaped board-side shielding portion arranged on a bottom portion outside the end portion of the protrusion and a plate-shaped GND terminal body standing on a protrusion-side end of the board-side shielding portion and arranged closer to the protrusion with respect to the high-frequency signal terminal, wherein the board-side shielding portion is formed with a board mounting portion exposed to the board side of the housing, extending diagonally from an inner edge of the board mounting portion towards the protrusion side to form a terminal body supporting portion, with a lower end of the GND terminal body supported at a tip of the terminal body supporting portion, and a high-frequency signal terminal housing hole is formed along the inner side of the terminal body supporting portion and the board mounting portion, with the high-frequency signal terminal arranged inside the high-frequency signal terminal housing hole.

2. The board-to-board connector according to claim 1, wherein the GND terminal portion integrally includes a reinforcing piece bent toward the protrusion from an upper edge of the GND terminal body.

3. The board-to-board connector according to claim 1, wherein the GND terminal body is formed with a length with which an upper end thereof reaches a top surface of the protrusion, and an end surface of the protrusion is covered with the GND terminal body.

4. The board-to-board connector according to claim 2, wherein a partner connector includes a partner GND terminal exposed at a portion facing an end surface of the protrusion and made of a conductive metal material, and the partner GND terminal contacts the GND terminal body.

5. The board-to-board connector according to claim 1, wherein a partner connector includes a partner high-frequency signal terminal that comes into contact with the high-frequency signal terminal, the partner high-frequency signal terminal has a connection groove formed by punching a conductive metal plate material, and the high-frequency signal terminal is inserted into the connection groove with plate thickness directions thereof perpendicular to each other and accordingly contacts a cut surface formed as an inner surface of the connection groove.

* * * * *